United States Patent
Yeh

(10) Patent No.: US 11,287,634 B2
(45) Date of Patent: Mar. 29, 2022

(54) CONTROL METHOD FOR AUTOMATED MICROSCOPE SYSTEM, MICROSCOPE SYSTEM AND COMPUTER-READABLE STORAGE MEDIUM

(71) Applicant: AETHERAI CO. LTD., Taipei (TW)

(72) Inventor: Chao-Yuan Yeh, Taipei (TW)

(73) Assignee: Aetherai Co., Ltd., Taipei (TW)

( * ) Notice: Subject to any disclaimer, the term of this patent is extended or adjusted under 35 U.S.C. 154(b) by 154 days.

(21) Appl. No.: 16/957,467

(22) PCT Filed: Dec. 25, 2018

(86) PCT No.: PCT/CN2018/123401
§ 371 (c)(1),
(2) Date: Jun. 24, 2020

(87) PCT Pub. No.: WO2019/128971
PCT Pub. Date: Jul. 4, 2019

(65) Prior Publication Data
US 2020/0326526 A1    Oct. 15, 2020

Related U.S. Application Data

(60) Provisional application No. 62/610,491, filed on Dec. 26, 2017.

(51) Int. Cl.
G02B 21/36 (2006.01)
G06N 3/08 (2006.01)
G06N 7/00 (2006.01)

(52) U.S. Cl.
CPC ............. *G02B 21/367* (2013.01); *G06N 3/08* (2013.01); *G06N 7/005* (2013.01)

(58) Field of Classification Search
USPC .......................................................... 348/79
See application file for complete search history.

(56) References Cited

U.S. PATENT DOCUMENTS

2015/0278625 A1* 10/2015 Finkbeiner ............. G02B 27/32
                                                                 348/79
2016/0062098 A1*  3/2016 Brown ................ G01N 21/6458
                                                                 348/80
2018/0156713 A1*  6/2018 Berezhna ........... G01N 15/1475
2019/0272638 A1*  9/2019 Mouton ................ G06T 17/205
2020/0088984 A1*  3/2020 Haase .................. G02B 21/125

* cited by examiner

*Primary Examiner* — Behrooz M Senfi
(74) *Attorney, Agent, or Firm* — Haverstock & Owens, A Law Corporation

(57) ABSTRACT

The present disclosure provides a method for controlling autonomous microscope system, microscope system, and computer readable storage medium. Taking the advantage of a neural network trained in a reinforcement learning scheme, the method automatizes the analysis process of biological sample executed by microscope system and therefore improves the diagnosis efficiency.

15 Claims, 2 Drawing Sheets

CONTROL METHOD FOR AUTOMATED MICROSCOPE SYSTEM, MICROSCOPE SYSTEM AND COMPUTER-READABLE STORAGE MEDIUM

TECHNICAL FIELD

The present disclosure discloses a field of autonomous microscope systems, and especially a method related to controlling an autonomous microscope system, a microscope system, and a computer readable storage medium.

BACKGROUND

Analysis of biological samples plays an important role in the diagnosis of diseases. For example, blood samples, slices of target tissue samples, samples of tissue fluid, etc. are analyzed to confirm whether there are any disease-relevant features in the samples. In order to improve the efficiency in analyzing biological samples, automated microscope systems have been started to be used in the art to reduce the time of manual operation. Specifically, most of this kind of automated microscope systems can provide the function of auto focus, such that it is beneficial for inspectors to find the field of view that is suitable for analysis.

However, as the disease detection has been popularized and complicated, when a large number of images are required to be analyzed, detecting and analyzing the images in a manual way may increase the incidence of detection errors and faults. Conventional automated microscope systems providing the function of auto focusing no longer measure up to the requirements in the art. Therefore, there is a need for an autonomous microscope system capable of finding the appropriate field of view, active analysis, and self-learning in the art.

SUMMARY

The objective of the present disclosure is to provide a method for controlling an autonomous microscope system and a computer readable storage medium, wherein the method can improve the analysis efficiency of biological samples.

Another objective of the present disclosure is to provide an autonomous microscope system that is able to prevent errors and faults caused by manual operation.

In order to achieve the aforementioned objectives, the present disclosure provides a method for controlling an autonomous microscope system, comprising the steps of: acquiring a low magnification image with a device; inputting the low magnification image to a first neural network to select a region of interest, wherein the first neural network is trained in a reinforcement learning scheme; magnifying the region of interest to generate a high magnification image; inputting the high magnification image to a second neural network to analyze whether the high magnification image comprises a target feature and generate a statistical result relevant to the target feature; and generating a feedback signal according to the statistical result and sending the feedback signal to the first neural network to train the first neural network in the reinforcement learning scheme.

Preferably, the first neural network is a first convolutional neural network or a fully connected neural network.

Preferably, the step of inputting the low magnification image to the first neural network to select the region of interest further comprises partitioning the low magnification image into a plurality of regions.

Preferably, the first neural network is the first convolutional neural network; wherein the plurality of regions are inputted to the first convolutional neural network to generate a probability distribution model; and wherein the probability distribution model represents the probability of any one of the plurality of regions to be the region of interest.

Preferably, when the first neural network finds that any one of the plurality of regions is the region of interest, a positive feedback signal is generated and sent to the first neural network to train the first neural network in the reinforcement learning scheme.

Preferably, when the first neural network selects any one of the plurality of regions as the region of interest, a negative feedback signal is generated and sent to the first neural network every specific time period to train the first neural network in the reinforcement learning scheme.

Preferably, the first neural network further comprises a supervised learning algorithm, an unsupervised learning algorithm, an imitation learning algorithm, or combinations thereof.

Preferably, the method further comprises: determining whether the statistical result satisfies an overall goal. Preferably, when the statistical result does not satisfy the overall goal, a negative feedback signal is generated and sent to the first neural network to train the first neural network in the reinforcement learning scheme.

Preferably, when the high magnification image does not comprise the target feature, a negative feedback signal is generated and sent to the first neural network to train the first neural network in the reinforcement learning scheme.

Preferably, the second neural network is a second convolutional neural network or a fully connected neural network.

Preferably, the second neural network is arranged to be an instance segmentation mode, a segmentation model or an image classification model to analyze whether the high magnification image comprises the target feature.

The present disclosure further provides a microscope system, characterized by comprising a processor performing the method for controlling the autonomous microscope system.

The present disclosure still further provides a computer readable storage medium with a program stored therein, wherein when the program is loaded to a computer, the computer performs the method for controlling the autonomous microscope system.

BRIEF DESCRIPTION OF DRAWINGS

The present disclosure can be further understood by referring to the following drawings and description. Non-limiting and non-exhaustive examples will be described with reference to the following drawings. The members in the drawings are not necessarily drawn in actual size. It is emphasized on illustrating the structure and principle.

DESCRIPTION OF EMBODIMENTS

Figure 1:
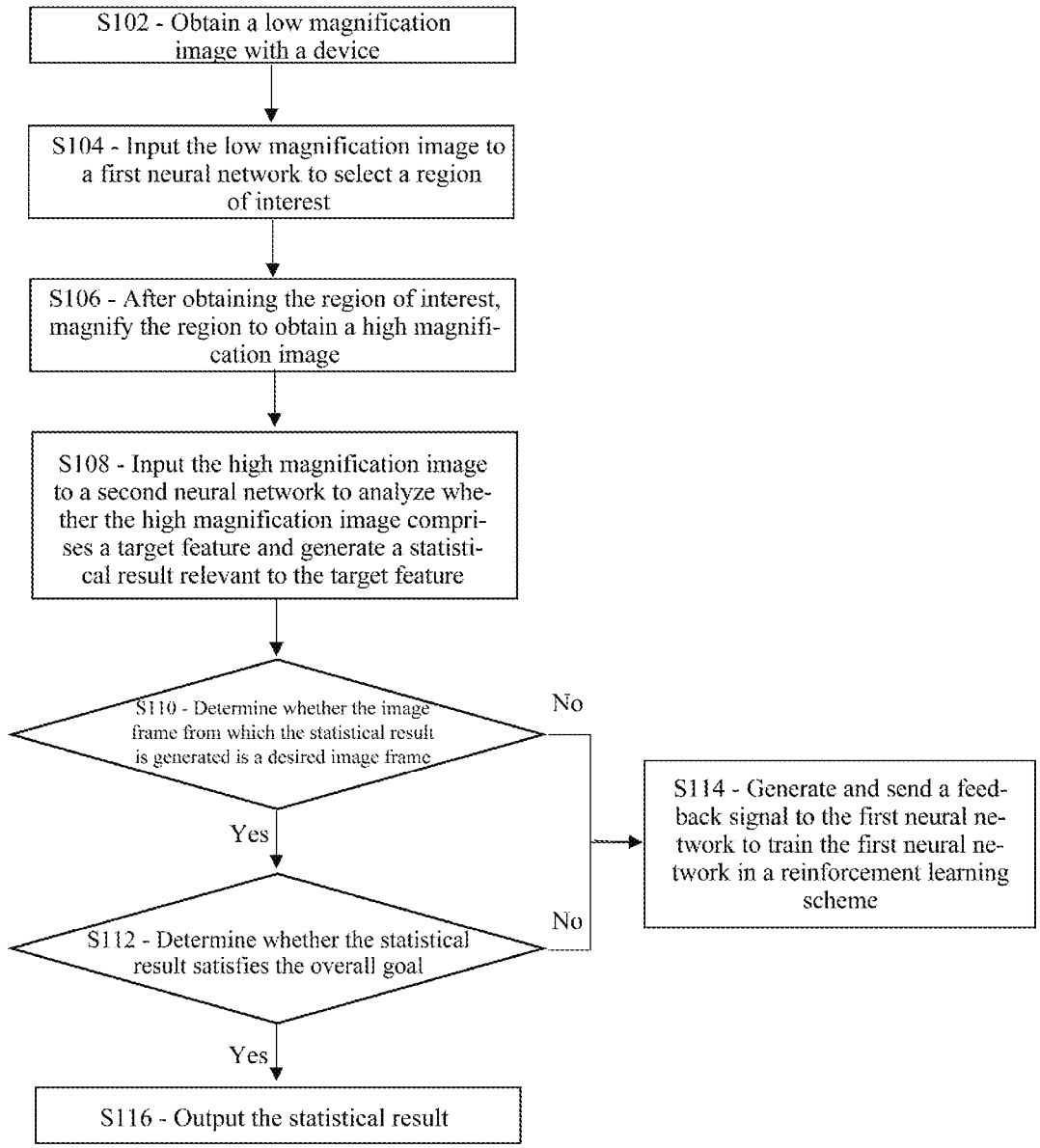
FIG. 1 is a flowchart of a method for controlling an autonomous microscope system in accordance with a particular embodiment of the present disclosure.

The present disclosure relates to a method for controlling an autonomous microscope system, a microscope system, and a computer readable storage medium. The characteristics of the present disclosure are reducing manual operation and enabling autonomous learning and analysis of biological samples.

The term "device" as disclosed in the present disclosure refers to an optical microscope, and especially to an autonomous microscope system. In a feasible embodiment, the autonomous microscope system comprises an optical unit, and the optical unit contains multiple sets of objective lenses of different magnifying power (for example, 5×, 10×, 20×, 40×, and 100×).

The conventional way of operating a microscope is finding a region of interest in the field of view using a low-power objective lens and then switching to a high-power objective lens for further detailed observation. Accordingly, the term "low magnification image" as disclosed in the present disclosure refers to an image obtained using an objective lens of relatively low magnifying power, while the term "high magnification image" as disclosed in the present disclosure refers to an image obtained using an objective lens of relatively high magnifying power. In a particular embodiment, the low magnification image refers to an image obtained using a 5× or 10× objective lens. In a particular embodiment, the high magnification image refers to an image obtained using a 20×, 40×, 100×, or higher-power objective lens. In a feasible embodiment, the low magnification image is defined relative to the high magnification image. That is, the magnifying power of the low magnification image is lower than the magnifying power of the high magnification image.

The term "target feature" as disclosed in the disclosure refers to a feature relevant to the analysis target. In a particular embodiment, the target feature is a specific type of cells, for example, bone marrow cells or cancer cells. In a preferred embodiment, the target feature refers to a feature relevant to a specific disease or its symptoms.

The term "region of interest" as disclosed in the present disclosure refers to a region of a biological sample under analysis in the device, where the region is determined to be relevant to the goal of the analysis. The elements of determining the region of interest comprise, but no limited to, image quality (for example, focus quality and/or dyeing quality of biological samples), presence and distribution of the target feature, or combinations thereof. The focus quality described above can be determined in various ways, for example, computing the average intensity of characteristic intervals of an image after fast Fourier transformation, or computing Laplacian of Gaussian values (LoG). In a feasible embodiment, the region of interest can be considered as an image frame having good image quality and the target feature.

The term "overall goal" as disclosed in the present disclosure is determined based on the analysis purpose. For example, in an embodiment of bone marrow smear, the purpose of the analysis is to compute the categorical distribution of cells in the bone marrow smear. Therefore, it can be set to a quantitative overall goal. For example, the overall goal is that the count of marrow cells which can be successfully classified reaches 500. In an embodiment of lymph node slice, the analysis purpose is to identify whether there are cancer cells present in the sliced tissue. Therefore, it can be set to a qualitative overall goal. For example, if there are cancer cells identified in the slice, the overall goal is achieved.

Embodiments will be described in detail below with reference to the accompanying drawings. In the accompanying drawings, the same and/or corresponding elements are designated with the same reference numerals.

FIG. 1 is a flowchart of a method for controlling an autonomous microscope system in accordance with an embodiment of the present disclosure. Although these steps are shown in the figure sequentially, it should be understood by a person skilled in the art that, in other embodiments, some of the steps can be interchanged or performed simultaneously.

In step S102, a low magnification image is obtained with a device. The low magnification image is an image of a biological sample taken by optical elements of an autonomous microscope system. In an embodiment, the biological sample is a bone marrow smear. The purpose of analysis for bone marrow smear embodiment is to calculate the categorical distribution of marrow cells in the sample. Therefore, the target feature is bone marrow cells, and the overall goal can be set to successfully classify 500 marrow cells. In another embodiment, the biological sample is a lymph node slice. The analysis purpose for the lymph node slice embodiment is to detect whether there are cancer cells in lymph nodes. Therefore, the target feature is cancer cell, and the overall goal is whether there are cancer cells present.

In Step S104, the low magnification image is inputted to a first neural network to select a region of interest. The first neural network can be a convolutional neural network (CNN) or a fully connected neural network (also known as multi-layer perceptron). In this embodiment, the first neural network is a first convolutional neural network trained in a reinforcement learning scheme. Therefore, the first neural network can be considered as comprising two parts: the first convolutional neural network and a reinforcement learning algorithm. In this embodiment, firstly, the low magnification image is partitioned into a plurality of regions, each region being a candidate region of interest. On the basis of this, the plurality of regions are inputted to the first convolutional neural network, and the first convolutional neural network is trained in the reinforcement learning scheme to output a probability distribution model. The probability distribution model represents the probability of selecting any one of the plurality of regions as the region of interest.

The reinforcement learning scheme uncovers potential rules from training data automatically and, preferably, trains the first neural network via a feedback mechanism. For example, when the first neural network obtains an image with good focus quality or an image having the target feature, a positive feedback signal is generated. In this way, the capability of the first neural network is optimized through the reinforcement learning scheme. Furthermore, when the first neural network selects any one of the plurality of regions as the region of interest, a negative feedback signal is generated and sent to the first neural network every specific time period. In this way, the reinforcement learning scheme can make the first neural network understand that spending too much time on finding a region of interest is not encouraged.

In a feasible embodiment, the first neural network further comprises a supervised learning algorithm, an unsupervised learning algorithm, an imitation learning algorithm, or combinations thereof. Taking the supervised learning algorithm as an example, images of bone marrow smear collected in advance are used as training data. Features of data extracted from the training data help the system recognize the target, and then the first neural network is informed of the answer corresponding to each sample. For example, in the embodiment for bone marrow smear, unduly dense distribution of marrow cells is unfavorable to the subsequent identification, while unduly sparse distribution of marrow cells reduces the processing efficiency. Therefore, preferably, the region of interest should have good image quality and marrow cells with appropriate density. An appropriate region is labeled as "1" by a human expert, while an ordinary sample is labeled as "0". On the basis of this, as the amount of training data accumulates, the first neural network can learn to identify the region comprising the target feature (region of interest). After that, when new image data is inputted, the first neural network can identify the probability that any one of the plurality of regions of the image belongs to the region of interest.

In step S106, after the region of interest is obtained, the region is magnified to obtain a high magnification image. In this embodiment, after the first neural network identifies the region of interest, the autonomous microscope system automatically moves the region of interest to the center of the field of view of the microscope and obtains the high magnification image of the region of interest with a high-power objective lens, such that more details of the region of interest can be shown.

In step S108, the high magnification image is inputted to a second neural network to analyze whether the high magnification image comprises the target feature and generate a statistical result relevant to the target feature. The second neural network can be a convolutional neural network or a fully connected neural network. In this embodiment, the second neural network comprises a second convolutional neural network which is an instance segmentation model, a segmentation model or an image classification model. This kind of model can identify individual objects and contours and categories thereof in the image and thus is used to analyze whether the high magnification image comprises the target feature.

In step S110, in the embodiment for bone marrow smear, the second neural network is arranged to identify bone marrow cells in the high magnification image of the region of interest, count the bone marrow cells, and generate a statistical result. If the second neural network does identify the presence of and count bone marrow cells in the high magnification image, the image frame comprised by this region of interest is defined as a desired image frame, and the statistical result is stored. On the other hand, if the second neural network doesn't identify the presence of marrow cells in the high magnification image, the image frame comprised by this region of interest is defined as an undesired image frame, and the method proceeds to step S114 to generate a feedback signal to the first neural network so as to train the first neural network in the reinforcement learning scheme.

In a preferred embodied aspect, a feedback signal is generated according to the statistical result, and the feedback signal is sent to the first neural network to train the first neural network in a reinforcement learning scheme. For example, in the embodiment for bone marrow smear, the overall purpose is that the high magnification images contain a total of 500 marrow cells. When there are more marrow cells counted in the high magnification images, the first neural network obtains a higher positive reward. On the other hand, if there are fewer bone marrow cells in the high magnification image obtained by magnifying the selected region of interest, the first neural network obtains a lower positive reward. More specifically, in a feasible embodied aspect, the form of the reward function used in the reinforcement learning algorithm can be $f(n)=\min(n/500, 1)$, wherein n is the number of marrow cells comprised in the high magnification image. Now the reward is determined by the number of marrow cells in the image. The maximum of the reward is 1, which means that there are at least 500 marrow cells in the high magnification image. The minimum of the reward is 0, which means that there is no marrow cell in the high magnification image. By maximizing the reward (which is equivalent to selecting a region comprising at least 500 marrow cells), the first neural network is trained to learn to achieve the overall goal.

In the embodiment for lymph node sections, the second neural network is arranged to identify follicle structures and cancer cells in the high magnification image of the region of interest. If the second neural network does identify the presence of follicle structures in the high magnification image, the image frame comprised by this region of interest is defined as a desired image frame, and the statistical result is stored. On the other hand, if the second neural network doesn't identify the presence of follicle structures in the high magnification image, the image frame comprised by this region of interest is defined as an undesired image frame, and the method proceeds to step S114 to generate a feedback signal to the first neural network so as to train the first neural network in the reinforcement learning scheme.

In step S112, it is determined whether the statistical result satisfies the overall goal, wherein the overall goal depends on the purpose of the analysis. When the statistical result satisfies the overall goal, the method proceeds to step S116. In the embodiment for bone marrow smear, when the accumulation of the number of marrow cells counted from the high magnification image of each region of interest achieves the overall goal (for example, 500 marrow cells), the method proceeds to step S116 to output the statistical result. In the embodiment of lymph node slice, when it is found that there are cancer cells present in the high magnification image, the overall goal is achieved, and the method proceeds to step S116 to output the statistical result. On the other hand, when the statistical result does not satisfy the overall goal, the method proceeds to step S114, where a feedback signal is used to make the first neural network learn how to achieve the overall goal.

Figure 2:
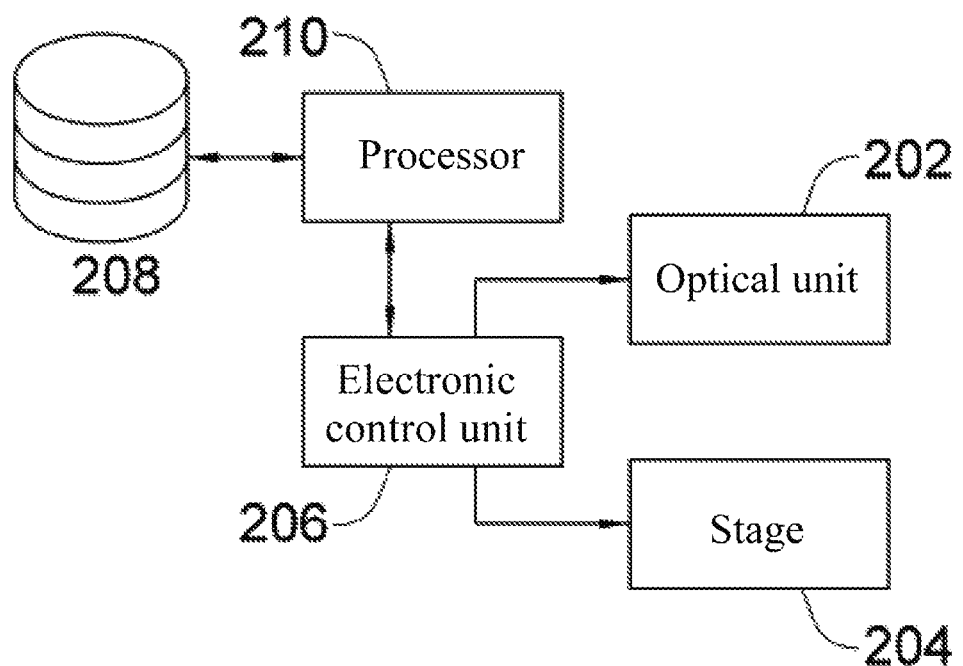
FIG. 2 is a block diagram of a microscope system in accordance with an embodiment of the present disclosure.

FIG. 2 is a block diagram of a microscope system in accordance with an embodiment of the present disclosure. In this embodiment, the microscope system is an autonomous microscope system 200, comprising an optical unit 202, a stage 204, an electronic control unit 206, a storage unit 208, and a processor 210.

The optical unit 202 is composed of objective lenses, relay optics, a trinocular, and a digital camera. The objective lenses are used to magnify an image of a biological sample. In a particular example, the optical unit has multiple objective lenses of different magnifying power (for example, 5×, 10×, 20×, 40×, and 100×) mounted on an electric front wheel. The magnified image passes the replay optics and arrives at the trinocular. The trinocular divides the incident light into three beams. Two of the three beams are used for human eyes, and the other one is used for the digital camera. The digital camera is used to obtain the image of the sample.

The stage 204 is used to place a microscope slide of the biological sample thereon. The stage 204 is movable in x, y, and z directions. Moving along the x and y directions is to change the field of view in which the biological sample is observed, and moving along the z direction is to focus on the biological sample.

The electronic control unit 206 is used to control the moving of the stage 204 or the action of the optical unit 202 (for example, rotating the electric front wheel to switch to an objective lens of different magnifying power) according to the output of the processor 210. The storage unit 208 is used to store images obtained by the optical unit 202 and one or more algorithms and/or predetermined rules. The one or more algorithms and predetermined rules can be used to make the processor 210 perform the method for controlling an autonomous microscope system as described in FIG. 1. In order to successfully perform the method for controlling an autonomous microscope system as described in FIG. 1, the storage unit 208 further stores a first neural network and a second neural network (not shown).

The processor 210 is disposed to perform automation steps based on the one or more algorithms and predetermined rules. For example, the procedure of image processing may include obtaining an image, analyzing the content of the image, and/or generating a relevant statistical result based on the analysis. Through the processor 210, the one or more algorithms and predetermined rules may assist the autonomous microscope system in identifying and obtaining images for diagnosis. For example, the reinforcement learning algorithm mentioned in the present disclosure can be disposed to decide an optimization action. As for obtaining the highest feedback, the algorithm can develop a strategy for moving the stage or changing the objective lenses to obtain the best focal plane.

In a particular embodiment, the processor 210 controls the action of the optical unit 202 via the electronic control unit 206 to utilize a low-power objective lens to take and obtain a low magnification image of the biological sample. After the low magnification image generated by the optical unit 202 is received, the processor 210 inputs the low magnification image to the first neural network to select a region of interest. Upon discovery of the region of interest, the processor 210 controls the stage 204 via the electronic control unit 206 to move the region of interest to the center of the field of view, and obtains a high magnification image by magnifying the region of interest via a high-power objective lens. This high magnification image shows more details of the biological sample under analysis.

Then, the processor 210 inputs the high magnification image to the second neural network to analyze whether the high magnification image comprises the target feature and generate a statistical result relevant to the target feature. Finally, the processor 210 generates a feedback signal according to the statistical result and sends the feedback signal to the first neural network to make the first neural network learn how to achieve the overall goal.

Furthermore, in another aspect of the present disclosure, different aspects of the above-mentioned method for controlling an autonomous microscope system as described in FIG. 1 may be embodied in software and may be interpreted as concepts of products which are usually in the form of executable program codes and/or associated data carried on or embodied in a computer readable storage medium. The computer readable storage medium comprises any or all types of memories, any or all other storage devices used for computers, processors, or the like, or associated modules thereof, such as various semiconductor memories, a magnetic tape storage device, a hard disk, and other similar device that can store software at any time.

All or a portion of the program may be communicated through a network such as the Internet or various other telecommunication networks at any time. Such communication, for example, may enable the program to be loaded from one computer or processor to another, such as from one device to a hardware platform of a computer environment or other system implementing a computer environment or other system of similar functions related to distributed machine learning techniques. Therefore, another type of medium loaded with the software, comprising optical waves, electric waves, and electromagnetic waves, can be used across physical interfaces between different local devices through wired and optical fixed networks and over various air-links. A physical element that carries the electronic waves described above, such as a wired or wireless network, an optical fiber network, or other similar networks, may also be considered as a medium loaded with the program. Terms such as "computer readable storage medium" used in the present disclosure, unless limited to tangible storage media, refer to any medium involved in providing instructions to a processor for execution.

Furthermore, common forms of computer readable storage media are as follows: a magnetic disk, a floppy disk, a hard disk, a magnetic tape, any other magnetic medium, a CD-ROM, a DVD or DVD-ROM, any other optical medium, punched tape, any other physical storage medium with punched holes, a RAM, a PROM and an EPROM, a FLASH-EPROM, any other memory chip or cartridge, a carrier wave carrying data or instruction, a cable or network carrying this carrier wave, or any other medium from which a computer reads program codes and/or data.

Those skilled in the art will recognize that the present teachings are amenable to a variety of modifications and/or enhancements. For example, although the implementation of various system components described above may be embodied in a hardware device, it may also be embodied in a software solution only, or an installation on an existing server. In addition, the method for controlling an autonomous microscope system as disclosed in the present disclosure may be implemented as a firmware, firmware/software combination, firmware/hardware combination, or hardware/firmware/software combination.

What is claimed is:

1. A method for controlling an autonomous microscope system, comprising
the steps of:
obtaining a low magnification image with a device;
inputting the low magnification image to a first neural network to select a region of interest, wherein the first neural network is trained in a reinforcement learning scheme;
magnifying the region of interest to generate a high magnification image;
inputting the high magnification image to a second neural network to analyze whether the high magnification image comprises a target feature and generate a statistical result relevant to the target feature; and
generating a feedback signal according to the statistical result and sending the feedback signal to the first neural network to train the first neural network in the reinforcement learning scheme.

2. The method for controlling an autonomous microscope system according to claim 1, wherein the first neural network is a first convolutional neural network or a fully connected neural network.

3. The method for controlling an autonomous microscope system according to claim 1, wherein the step of inputting the low magnification image to the first neural network to select the region of interest further comprises partitioning the low magnification image into a plurality of regions.

4. The method for controlling an autonomous microscope system according to claim 3, wherein the first neural network is the first convolutional neural network or a fully connected neural network; wherein the plurality of regions are inputted to the first convolutional neural network to generate a probability distribution model; and wherein the probability distribution model represents the probability of any one of the plurality of regions to be the region of interest.

5. The method for controlling an autonomous microscope system according to claim 3, wherein when the first neural network finds that any one of the plurality of regions is the region of interest, a positive feedback signal is generated and sent to the first neural network to train the first neural network in the reinforcement learning scheme.

6. The method for controlling an autonomous microscope system according to claim 3, wherein when the first neural network selects any one of the plurality of regions as the region of interest, a negative feedback signal is generated and sent to the first neural network every specific time period to train the first neural network in the reinforcement learning scheme.

7. The method for controlling an autonomous microscope system according to claim 1, wherein the first neural network is further trained by a supervised learning algorithm, an unsupervised learning algorithm, an imitation learning algorithm, or combinations thereof.

8. The method for controlling an autonomous microscope system according to claim 1, wherein the method further comprises: determining whether the statistical result satisfies an overall goal.

9. The method for controlling an autonomous microscope system according to claim 8, wherein when the statistical result does not satisfy the overall goal, a negative feedback signal is generated and sent to the first neural network to train the first neural network in the reinforcement learning scheme.

10. The method for controlling an autonomous microscope system according to claim 1, wherein when the high magnification image does not comprise the target feature, a negative feedback signal is generated and sent to the first neural network to train the first neural network in the reinforcement learning scheme.

11. The method for controlling an autonomous microscope system according to claim 1, wherein the second neural network is a second convolutional neural network or a fully connected neural network.

12. The method for controlling an autonomous microscope system according to claim 1, wherein the second neural network is arranged to be an instance segmentation model, a semantic segmentation model or an image classification model to analyze whether the high magnification image comprises the target feature.

13. A microscope system, characterized by comprising a processor performing a method for controlling an autonomous microscope system comprising:
obtaining a low magnification image with a device;
inputting the low magnification image to a first neural network to select a region of interest, wherein the first neural network is trained in a reinforcement learning scheme;
magnifying the region of interest to generate a high magnification image;
inputting the high magnification image to a second neural network to analyze whether the high magnification image comprises a target feature and generate a statistical result relevant to the target feature; and
generating a feedback signal according to the statistical result and sending the feedback signal to the first neural network to train the first neural network in the reinforcement learning scheme.

14. The microscope system according to claim 13, further comprising an optical unit, a stage, an electronic control unit, a storage unit, or combinations thereof.

15. A computer readable storage medium with a program stored therein, wherein when the program is loaded to a computer, the computer performs a method for controlling an autonomous microscope system comprising:
obtaining a low magnification image with a device;
inputting the low magnification image to a first neural network to select a region of interest, wherein the first neural network is trained in a reinforcement learning scheme;
magnifying the region of interest to generate a high magnification image;
inputting the high magnification image to a second neural network to analyze whether the high magnification image comprises a target feature and generate a statistical result relevant to the target feature; and
generating a feedback signal according to the statistical result and sending the feedback signal to the first neural network to train the first neural network in the reinforcement learning scheme.

* * * * *